United States Patent [19]

Ruebig et al.

[11] 3,926,089

[45] Dec. 16, 1975

[54] SAFETY PIN

[75] Inventors: Herbert Ruebig; Helmut Ruebig, both of Wels, Austria

[73] Assignee: Franz Rubig & Sohne KG, Wels, Austria

[22] Filed: Oct. 16, 1973

[21] Appl. No.: 406,962

[30]  Foreign Application Priority Data
Oct. 31, 1972   Austria ............................... 9240/72

[52] U.S. Cl. .................................... 85/5 CP; 85/8.3
[51] Int. Cl.² ......................................... F16B 21/18
[58] Field of Search ...................... 85/8.3, 5 CP, 5 R

[56]  References Cited
UNITED STATES PATENTS

| | | | |
|---|---|---|---|
| 148,421 | 3/1874 | Dance | 85/5 CP |
| 877,281 | 1/1908 | Allen | 85/5 CP |
| 1,107,881 | 8/1914 | Bernsten et al. | 85/5 CP |
| 2,514,594 | 7/1950 | Weiler | 85/5 CP |
| 2,674,169 | 4/1954 | Sawyer | 85/5 CP |
| 3,077,810 | 2/1963 | Heidbrink | 85/5 CP |
| 3,132,556 | 5/1964 | Doering et al. | 85/5 CP |
| 3,383,972 | 5/1968 | Jackson et al. | 85/5 R |
| 3,433,118 | 3/1969 | Ward | 85/8.3 |

*Primary Examiner*—Marion Parsons, Jr.
*Attorney, Agent, or Firm*—Otto John Munz

[57]  ABSTRACT

A loop-shaped spring member has mutually opposite ends, which are pivoted to a pin member adjacent to each other near one end of said pin member. The spring member has an intermediate portion which is pivotally movable about said ends of said spring member into and out of engagement with one side of said pin member near the opposite end thereof. Said pin member is formed on one side near said opposite end thereof with a recess which is adapted to receive and releasably hold said intermediate portion of said spring member under initial stress.

2 Claims, 5 Drawing Figures

SAFETY PIN

CROSSREFERENCE TO A RELATED APPLICATION

Priority of corresponding Austrian P.A. No. A 9240/72 filed on Oct. 31, 1972 is claimed under the Convention.

FIELD OF THE INVENTION

Safety pin assembly for axles and rotating shafts classified in Class 85, Subclass 5.

DESCRIPTION OF THE PRIOR ART

Safety pins are known which are provided with a spring loop which can be swung off and down. Such safety pins may be described as hinged safety pins and have been used on a considerable scale as means for locking shafts, axles, cotters and the like. When the spring loop has been swung toward the pin proper and encloses the end portion of the shaft or the like, the safety pin should be safely held in position.

Known safety pins comprise a pin member which has a substantially constricted neck. One end of a slightly spirally curved annular or U-shaped member may be connected to the pin member below that neck whereas the other end has been formed into an eyelet and engages the head of the pin member and is slidable on the neck. Alternatively, both ends of the annular member may be bent into eyelets and slidably mounted on the neck. When the safety pin is in locked position, that annular member engages the pin member on that side which is on the inside with respect to the end of the shaft or axle which is to be locked. The safety pin can be unlocked by pressure applied to that end of the annular member which engages the head of the pin member. Particularly in agricultural or construction machines subjected to rough usage, such pressure may be inadvertently applied to the end of the annular member so that the same is swung out of its locking position and the safety pin falls out of the bore of the shaft. Besides, it is difficult to embrace the neck of the pin member with an eyelet formed by the resilient material of the annular member and it is also difficult to form the head adjacent to a neck around which the eyelet or eyelets have been applied before.

Cotters which are fixed, i.e., cannot rotate, have been provided with horizontal bores, into which a safety pin member has been introduced which was provided with a prestressed annular or U-shaped spring which in locking position was received in a groove of the cotter. When the safety pin is fully inserted into the transverse bore, the prestressed spring can be swung off and the safety pin can be pulled out of the transverse bore. If the arrangement was used in an agricultural machine the spring could be swung off inadvertently and the safety pin could fall out e.g., when the machine is used to plow a stubble-field or to clear land for cultivation and the safety pin is mounted on the tractor linkage drawbar close to the ground.

SUMMARY OF THE INVENTION

The present invention provides a safety pin which is intended for axles and for rotating shafts and in which the spring loop cannot swing off inadvertently because the safety pin is provided on the outside with a recess into which the spring loop can snap when swung down. The recess may consist of a notch which is inclined to the axis of the safety pin.

BRIEF DESCRIPTION OF THE DRAWINGS

Two embodiments of the hinged safety pin according to the invention are shown by way of example on the accompanying drawing, in which FIG. 1 is a side elevation showing a first embodiment with the spring loop which has been swung down but has not been snapped in.

FIG. 3 is like FIG. 1 a side elevation but shows the hinged safety pin with the spring loop snapped in.

DESCRIPTION OF THE PREFERRED EMBODIMENTS

Figure 1:
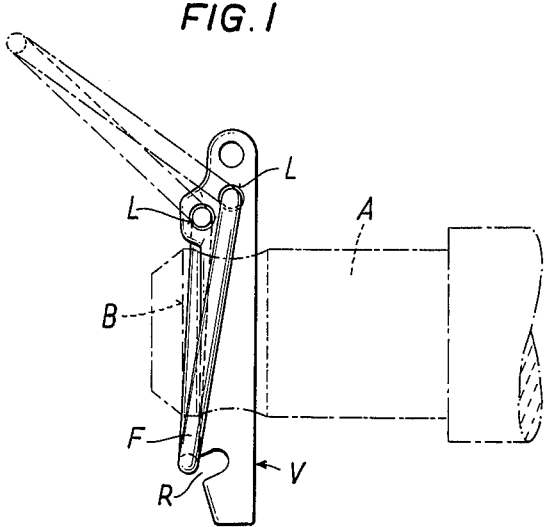
Figure 2:
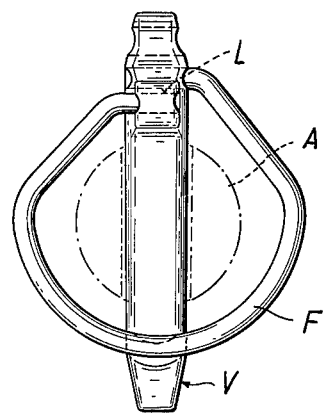
FIG. 2 is an associated front elevation.
Figure 3:
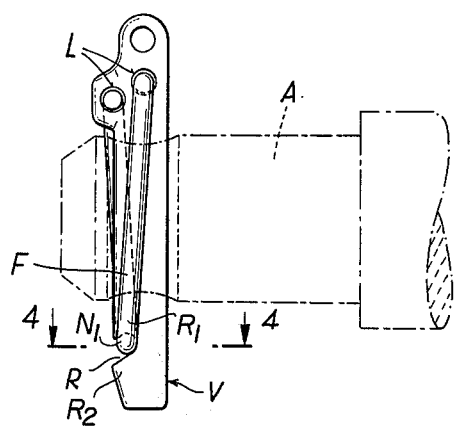

A safety pin member V is disposed in a bore B of an axle A. The pin member has two through holes L, $L_1$ and $L_2$ respectively in which the ends of an annular spring loop F are pivotally mounted. FIG. 1 shows the spring loop in a swung-off position with dotted lines and in a swung-down position with solid lines. When the spring loop is in the latter position, the spring can be forced into an inclined notch R with an upper arm $R_1$ and a lower arm $R_2$ formed in the safety pin member. The spring loop is held in this notch by the spring force. The inclined notch of FIGS. 1 to 4 in its arm shown as the upper arm is provided with a safety catch or nose $N_1$ directed downwardly to prevent slipping and disengagement of the spring loop, after it has been snapped in. The spring loop can be removed from the notch by pressure or tension applied to the spring loop in the opposite direction.

Figure 5:
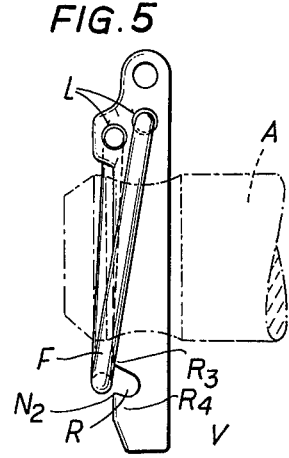
FIG. 5 is a view similar to FIG. 1 and shows the second embodiment.
Figure 4:
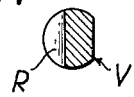
FIG. 4 shows the safety pin in a sectional view taken on line 4—4 in FIG. 3.

In the embodiment shown in FIG. 5, the notch R with its upper side $R_3$ have the opposite inclination. The nose $N_2$ in this embodiment is provided in the arm $R_4$ thereof shown as the lower arm, for the same purpose of holding the spring loop in its snapped in position. The safety pin may be of course applied also in any position at an angle to vertical and the definitions "upper" and "lower" are used only for brevity purposes.

The safety pin member is suitably drop-forged. The notch R may be milled or formed by other methods.

The dual function of the spring loop greatly improves the locking action of the safety pin so that it is most unlikely that the same could be released and fall out.

What is claimed is:

1. A safety pin assembly for axles and rotating shafts which comprises
   a pin member having opposite ends;
   a loop shaped snap-in spring member of a circular diameter having opposite ends which are pivoted to said pin member adjacent to each other near one end thereof, and an intermediate portion which is pivotally movable about said ends of said spring member into and out of engagement with one side of said pin member near the opposite end thereof,
   said pin member being formed on one side near said opposite end thereof with a u-shaped recess with an actuate bottom which is adapted to fully receive and releasably hold said intermediate portion of said spring member under initial stress;
   said recess shaped as an inclined notch with an upper and a lower arm, which extend from the surface of said pin member inwardly forming at the inner end of said notch said recess and a safety catch nose in the outer end of one of said arms inclined toward the outer end of the other said arm;

whereby the catch-end of said loop, when in ingagement with said notch is embedded therein and thus protected against disengagement by accidental extraneous impacts against it.

2. A safety pin assembly for axles and shafts comprising a pin having at one end a loop-bearing means and at its opposite end a notch of u-shaped cross-section with an arcuate bottom;

a looped shaped spring of a circular cross-section mounted with the end portions of the loop in said bearing means for a pivotable swinging motion toward said notch in a plane perpendicular to the axis of the pin and having its opposite catch end portion of the loop spaced to engage matingly with said notch;

said notch inclined to the axis of said pin to permit swinging engagement of the catch end of said loop therewith;

said notch having a nose-catch for said catch-end of said loop;

said nose-catch slightly protruding into the swinging path of said loop a distance permitting a releasable snap-in locking of the spring loop under said nose in said notch;

whereby the catch-end of said loop, when in engagement with said notch is embedded therein and thus protected against disengagement by accidental extraneous impacts against it.

* * * * *